United States Patent
Buerger et al.

(10) Patent No.: US 10,486,305 B2
(45) Date of Patent: Nov. 26, 2019

(54) METHOD, COMPUTER PROGRAM AND SYSTEM FOR CONTROLLING A PLURALITY OF ROBOTS, AND COMPUTER-READABLE STORAGE MEDIUM

(71) Applicant: Robert Bosch GmbH, Stuttgart (DE)

(72) Inventors: Mathias Buerger, Stuttgart (DE); Philipp Christian Schillinger, Renningen-Malmsheim (DE)

(73) Assignee: Robert Bosch GmbH, Stuttgart (DE)

(*) Notice: Subject to any disclaimer, the term of this patent is extended or adjusted under 35 U.S.C. 154(b) by 197 days.

(21) Appl. No.: 15/704,782

(22) Filed: Sep. 14, 2017

(65) Prior Publication Data
US 2019/0070725 A1    Mar. 7, 2019

(30) Foreign Application Priority Data
Sep. 1, 2017 (DE) .......................... 10 2017 215 311

(51) Int. Cl.
| | | |
|---|---|---|
| *B25J 9/00* | (2006.01) | |
| *G05B 19/042* | (2006.01) | |
| *G06N 3/00* | (2006.01) | |
| *G06N 5/04* | (2006.01) | |
| *G05D 1/02* | (2006.01) | |

(52) U.S. Cl.
CPC ........ *B25J 9/0084* (2013.01); *G05B 19/0426* (2013.01); *G05D 1/02* (2013.01); *G06N 3/008* (2013.01); *G06N 5/046* (2013.01); *Y10S 901/30* (2013.01); *Y10S 901/50* (2013.01)

(58) Field of Classification Search
CPC ........ G06N 3/008; G06N 5/046; G05B 19/00; G05D 1/02; B25J 9/0084; Y10S 901/50; Y10S 901/30
See application file for complete search history.

(56) References Cited

U.S. PATENT DOCUMENTS

| | | | | |
|---|---|---|---|---|
| 5,825,981 A | * | 10/1998 | Matsuda .......... | G05B 19/41815 700/248 |
| 8,428,777 B1 | * | 4/2013 | Poursohi .......... | G05B 19/41865 700/247 |
| 2004/0162638 A1 | * | 8/2004 | Solomon ................ | F41H 13/00 700/247 |

OTHER PUBLICATIONS

Schillinger et al., "Decomposition of Finite LTL Specifications for Efficient Multi-Agent Planning", Systems (DARS), London, UK, Nov. 8, 2016, technical paper, 14 pages.
Schillinger et al., "Decomposition of Finite LTL Specifications for Efficient Multi-Agent Planning", Systems (DARS), London, UK, Nov. 8, 2016, presentation, 17 pages.
(Continued)

*Primary Examiner* — Stephen Holwerda
(74) *Attorney, Agent, or Firm* — Norton Rose Fulbright US LLP; Gerard Messina

(57) ABSTRACT

A method for controlling a plurality of agents to complete a mission, including deriving a decomposition set of decomposition states in a set of possible states of an automaton, wherein the automaton characterizes the mission, deriving a sequence of actions to be carried out by the plurality of agents depending on the decomposition set, where each action is to be carried out by at most one of the plurality of agents.

22 Claims, 6 Drawing Sheets

(56) References Cited

OTHER PUBLICATIONS

Schillinger et al., "Multi-Objective Search for Optimal Multi-Robot Planning with Finite LTL Specifications and Resource Constraints", conference with publication: IEEE International Conference on Robotics and Automation (ICRA), Singapore, May 30, 2017, technical paper, pp. 768-774.

Schillinger et al., "Multi-Objective Search for Optimal Multi-Robot Planning with Finite LTL Specifications and Resource Constraints", Singapore, May 30, 2017, presentation, 13 pages.

Schillinger et al., "Simultaneous Task Allocation and Planning", workshop presentation at conference: The What without the How (Workshop), Robotics: Science and Systems (RSS), Cambridge, MA, USA, Jul. 15, 2017, presentation, 15 pages.

Schillinger et al., "Specification Decomposition and Formal Behavior Generation in Multi-Robot Systems", poster presentation at PhD School: 3rd Lucia PhD School on Artificial Intelligence and Robotics, Örebro, Sweden, Dec. 12, 2016, 1 page.

\* cited by examiner

METHOD, COMPUTER PROGRAM AND SYSTEM FOR CONTROLLING A PLURALITY OF ROBOTS, AND COMPUTER-READABLE STORAGE MEDIUM

CROSS REFERENCE

The present application claims the benefit under 35 U.S.C. § 119 of German Patent Application No. DE 102017215311.3 filed on Sep. 1, 2017, which is expressly incorporated herein by reference in its entirety.

FIELD

The present invention relates to a method for controlling a plurality of robots, a computer program and a system configured to carry out the method and a computer-readable storage medium.

BACKGROUND INFORMATION

Linear Temporal Logic (LTL) is a mathematical specification logic which is able to capture temporal relationships. It originally results from the field of model checking and verification.

SUMMARY

An example method in accordance with the present invention may have the advantage that it automatically generates optimal action-level behavior for a team of robots (or agents). In accordance with the present invention, separable tasks are optimally allocated to the available agents or robots, while avoiding the need of computing a combinatorial number of possible assignment costs, where each computation would itself require solving a complex planning problem, thus improving computational efficiency, in particular for on-demand missions where task costs are unknown in advance.

Further advantageous aspects are described herein.

LTL can be applied to robotic behavior planning. It then provides a formalism to specify an expected behavior in an unambiguous way. As such, an LTL specification can be used to describe a result of the expected behavior, while the way to achieve this result can be automatically derived by the system.

An LTL formula $\phi$ can be defined over a set of atomic propositions $\Pi$. A single atomic proposition is notated $\pi \in \Pi$. Each atomic proposition can be either true $\top$ or false $\bot$. To express temporal relationships, the semantics of the formula $\phi$ can be defined over a sequence $\sigma$ of propositions. Conveniently, the sequence $\sigma$ is defined as a function of time index t, and $\sigma(t) \subseteq \Pi$ for each t.

A proposition may be expressed in terms of concatenations of atomic proposition using the Boolean operators and ("$\wedge$") and/or or ("$\vee$").

Boolean operators $\neg$ ("not") and $\wedge$ ("and") and temporal operators $\mathcal{O}$ ("next"), $\mathcal{U}$ ("until") and $\mathcal{R}$ ("release") can be used to recursively define a satisfaction relation $\vDash$ as follows:

$\sigma(t) \vDash \pi$ iff $\pi \in \sigma(t)$ $\sigma(t) \vDash \neg \phi_1$ iff $\neg(\sigma(t) \vDash \phi_1)$ $\sigma(t) \vDash \phi_1 \wedge \phi_2$ iff $\sigma(t) \vDash \phi_1 \wedge \sigma(t) \vDash \phi_2$ $\sigma(t) \vDash \mathcal{O} \phi_1$ iff $\sigma(t+1) \vDash \phi_1$ $\sigma(t) \vDash \phi_1 \mathcal{U} \phi\_2$ iff $\exists t_2 \geq t$ such that $\sigma(t_2) \vDash \phi_2$ and $\forall t_i \in [t, t_2)$ it holds that $\sigma(t_1) \vDash \phi_1$ $\sigma(t) \vDash \phi_1 \mathcal{R} \phi_2$ iff $t_1 = \infty$ or $\exists t_1 \geq t$ such that $\sigma(t_1) \vDash \phi_1$ and $\forall t_2 \in [t, t_2)$ it holds that $\sigma(t_2) \vDash \phi_2$.

A Non-deterministic finite automaton $\mathcal{F}$ is characterized by a tuple $\mathcal{F} = (Q, Q_0, \alpha, \delta, F)$ consisting of

- a set of states Q,
- a set of initial states $Q_0 \subseteq Q$,
- a set of Boolean formulas $\alpha$ over the set of atomic propositions $\Pi$,
- transition conditions $\delta: Q \times Q \to \alpha$, and
- a set of accepting (final) states $F \subseteq Q$.

Note that the term nondeterministic finite automaton $\mathcal{F}$ is used in the broad sense that also encompasses deterministic finite automata, i.e., every deterministic finite automaton is also a nondeterministic finite automaton in this sense.

For two states $q_i, q_j \in Q$, the absence of a transition between these two states is denoted by $\delta(q_i, q_j) = \bot$. Accordingly, there exists a transitions between these two states if $\delta(q_i, q_j) \neq \bot$, and the Boolean formula $\delta(q_i, q_j)$ denotes the transition condition.

A sequence $\sigma$ over propositions when applied to the nondeterministic finite automaton $\mathcal{F}$ describes a sequence of states $q \in Q$, called a run $\rho: \mathbb{N} \cup \{0\} \to Q$. The run $\rho$ is called feasible if it starts in an initial state $\rho(0) = q_0$ with $q_0 \in Q_0$ and if all transition conditions are satisfied along the run $\sigma(t) \vDash \delta(\rho(t-1), \rho(t))$ for all t. A run $\rho$ is called accepting if it is feasible and ends in an accepting state $q_n \in F$. Sequence $\sigma$ is called to violate the specification if it does not describe a feasible run.

If sequence $\sigma$ describes a feasible but not an accepting run, it does not satisfy the specification. If sequence $\sigma$ forms a prefix of an accepting run and can be extended to a sequence satisfying the specification, it is said that $\sigma$ partially satisfies $\phi$.

A given mission $\mathcal{M}$ that is to be completed by a set of agents can be expressed in terms of an LTL formula $\phi$ or equivalently in terms of a nondeterministic finite automaton $\mathcal{F}$. It may be given as a set of tasks $\mathcal{M} = \{\mathcal{T}_1, \ldots, \mathcal{T}_n\}$. The tasks $\mathcal{T}_i$ are independent parts of the mission that can be allocated to the agents. The above-mentioned set of tasks is called a decomposition of the mission $\mathcal{M}$. This implies two decomposition properties which are fulfilled by all tasks. The tasks have to be mutually independent, i.e. execution or non-execution of a first task $\mathcal{T}_i$ must not violate a second task $\mathcal{T}_j$. Furthermore, completion of each of the tasks $\mathcal{T}_1, \ldots, \mathcal{T}_n$ implies completion of the mission $\mathcal{M}$.

This enables acting agents to act independently, without any coordination, and execution does not have to be synchronized between the agents.

A task $\mathcal{T}_i$ may be specified by an LTL formula $\phi^{(i)}$ or a nondeterministic finite automaton $\mathcal{F}^{(i)}$. The conditions of mutual independence and completeness can be expressed by saying that any strategy that satisfies each LTL formula $\phi^{(i)}$ that specifies task $\mathcal{T}_i \in \mathcal{T}_C$ for a strict subset of tasks $\mathcal{T}_C \subset \{\mathcal{T}_1, \ldots, \mathcal{T}_n\}$ partially satisfies the LTL formula $\phi$ that specifies the mission $\mathcal{M}$.

Consequently, completing the subset of tasks $\mathcal{T}_C$ can be associated with reaching a certain state in the nondeterministic finite automaton $\mathcal{F}$ that also specifies the mission $\mathcal{M}$. However, not every state implies completion of a set of tasks when requiring the above properties.

Therefore, a first aspect of the invention makes us of a decomposition set $\mathcal{D}$ of the nondeterministic finite automaton $\mathcal{F}$ that specifies the mission $\mathcal{M}$. The decomposition set $\mathcal{D}$ contains all states q which can be associated with completing the subset of tasks $\mathcal{T}_C$ which is a subset of the decomposition $\{\mathcal{T}_1, \ldots, \mathcal{T}_n\}$ of the mission $\mathcal{M}$.

Based on the decomposition set $\mathcal{D}$, a team model that can be augmented to contain all possible decomposition choices. This team model can then be used for efficiently planning an optimal decomposition and a corresponding allocation of tasks to agents. It can also be used for at the same time planning action sequences to execute the mission.

To make the relation between formula $\phi^{(i)}$ that specifies task $\mathcal{T}_i$ and the LTL formula $\phi$ that specifies the mission $\mathcal{M}$ clear, we let $\{\phi^{(i)}\}$ with i=1, ..., n be a set of finite LTL specifications for the tasks and $\{\mathcal{T}_i\}$ and $\{\sigma_i\}$ denote sequences that satisfy the tasks $\{\phi^{(i)}\}$, i.e. $\sigma_i \models \phi^{(i)} \forall i \in \{1, \ldots, n\}$. The tasks $\{\mathcal{T}_i\}$ are a decomposition of the mission $\mathcal{M}$ if and only if $\sigma_{j_1} \ldots \sigma_{j_i} \ldots \sigma_{j_n} \models \phi$ for all permutations of $j_i \in \{1, \ldots, n\}$ and all respective sequences $\sigma_i$. If tasks $\{\mathcal{T}_i\}$ are a decomposition of the mission $\mathcal{M}$, they fulfill the decomposition properties of independence and completeness regarding the mission $\mathcal{M}$.

The several aspects of the present invention avoid the need of computing a combinatorial number of possible assignment costs, where each computation would itself require solving a complex planning problem, thus improving computational efficiency, in particular for on-demand missions where task costs are unknown in advance.

Therefore, in the first aspect, the present invention includes a method for controlling a plurality of agents to complete the mission $\mathcal{M}$, comprising the steps of:

deriving the decomposition set $\mathcal{D}$ of decomposition states in the set of possible states Q of the automaton $\mathcal{F}$, wherein the automaton $\mathcal{F}$ characterizes the mission $\mathcal{M}$, deriving a sequence $\beta_{fin}$ of actions $(a_1, a_2, \ldots, a_n)$ to be carried out by the plurality of agents depending on the decomposition set $\mathcal{D}$, where each action $(a_1, a_2, \ldots, a_n)$ is to be carried out by at most one of the plurality of agents.

Preferably, the method may further comprise the step of controlling the plurality of agents in accordance with the derived sequence $\beta_{fin}$ of actions $(a_1, a_2, \ldots, a_n)$.

In another aspect of the present invention, the method further comprises the step of generating the decomposition set $\mathcal{D}$ by exploring an essential sequence $\sigma_e$ of an accepting run $\rho_i$ through one or more candidate decomposition states $q_i$.

Preferably, this method further comprises the step of adding the one or more candidate decomposition state $q_i$ to the decomposition set $\mathcal{D}$ depending on whether a complementary sequence $\hat{\sigma}_e$ to the explored essential sequence $\sigma_e$ around the respective one or more candidate decomposition state $q_i$ is accepting.

Even more preferably, the decomposition set $\mathcal{D}$ consists of all those states $q_i$ in the set of possible states Q of the automaton $\mathcal{F}$, for which the complementary sequence $\hat{\sigma}_e$ to the explored essential sequence $\sigma_e$ around the respective state $q_i$ is accepting.

In another aspect of the present invention, the method further comprises the step of generating a team model $\mathcal{G}$ based on the automaton $\mathcal{F}$ that characterizes the mission $\mathcal{M}$ and based on automata $\mathcal{A}^{(r)}$ that each characterize the capabilities of one of the plurality of agents.

Preferably, it may be envisaged that the team model $\mathcal{G}$ comprises a set of actions $A_\mathcal{G}$ that comprises switch transitions $\varsigma$ which change the acting agent from one of the plurality of agents to another one of the plurality of agents.

That is, individual agents are assumed to act independently and based on the decomposition set, special transitions (the switch transitions $\varsigma$) indicate the options to split the mission at some state and allocate the rest to a different agent. In other words, the switch transitions $\varsigma$ are purely virtual transitions that by themselves do not lead to any actions of the agents.

More preferably, these the switch transitions $\varsigma$ are configured to each change the acting agent from one of the plurality of agents to a next one of the plurality of agents. This is particularly useful because it implies that, starting in a state associated with a first agent r, no state associated with an agent r'<r can be reached by any path in the team model.

As indicated above, preferably the switch transitions $\varsigma$ are configured such as to only act if the automaton $\mathcal{F}$ is in a decomposition state.

In another aspect of the present invention, the method further comprises the step of deriving the sequence $\beta_{fin}$ of actions $(a_1, a_2, \ldots, a_n)$ to be carried out by the plurality of agents by a label-setting algorithm in which each state s of a set of states $S_\mathcal{G}$ of the team model $\mathcal{G}$ is associated with labels l that are characterized by a sequence $\beta$ of action leading to the respective state s. That is, the label-setting algorithm searches for a final label $l_{fin}$. Finding the final label $l_{fin}$ is equivalent to finding the respective sequence $\beta_{fin}$ of actions that satisfies the mission.

Preferably, this method further comprises the step of constructing a reachable set of temporary labels $L_{t,s}$ for each state s and a set of permanent labels $L_{p,s}$.

Even more preferably, this method further comprises the step of constructing, for each selected label l*, a set V of consecutive labels v by extending an action sequence $\beta$ associated to the selected label l* by all available actions a and adding the resulting labels $l_v$ to the reachable set of temporary labels $L_{t,s}$.

Preferably, each label l comprises at least one component that characterizes a cost $\hat{c}_\beta$ under the corresponding sequence $\beta$ of actions a.

Even more preferably, it may be envisaged that the derived sequence $\beta_{fin}$ of actions $(a_1, a_2, \ldots, a_n)$ to be carried out by the plurality of agents is the one out of all actions that satisfy a characterization $\phi$ of the mission $\mathcal{M}$ that minimizes a team cost $\hat{\kappa}$ which depends on the component that characterizes the cost $\hat{c}_\beta$.

Preferably, only actions a resulting in Pareto-optimal labels $l_v$ at their target state v are added to the reachable set of temporary labels $L_{t,s}$. This is a very efficient implementation.

In another aspect of the present invention, the component that characterizes the cost $\hat{c}_\beta$ under the corresponding sequence $\beta$ of actions a depends on costs $c_{a,r}$ associated with each of these actions a with one component each for each one of the agents.

Preferably, the component that characterizes the cost $\hat{c}_\beta$ under the corresponding sequence $\beta$ of actions a is stored in memory by way of a data structure that comprises at least one component $c_{\beta,r}$ that characterizes costs associated with a selected one of the agents 11, 12, 13 and at least one component $\|(c_{\beta,1}, \ldots, c_{\beta,r-1})^T\|_\infty$, $\|(c_{\beta,1}, \ldots, c_{\beta,r-1})^T\|_1$ that characterizes the costs associated with a group of agents that precede the selected one of the agents.

This makes use of the surprising fact that, starting in a state associated with agent r, no state associated with a preceding agent r'<r can be reached by any path in the team model $\mathcal{G}$, i.e., no action associated with any r' will occur in a continuation of the corresponding sequence $\gamma$.

In another aspect of the present invention, each label l comprises at least one component that characterizes a resource status γ at the respective state s under the corresponding sequence β of actions.

Preferably, the characterization φ of the mission $\mathcal{M}$ comprises an inequality constraint that restricts the at least one component that characterizes a resource status γ to a predefined region.

BRIEF DESCRIPTION OF THE DRAWINGS

The present invention is explained in more detail below with reference to figures.

DETAILED DESCRIPTION OF EXAMPLE EMBODIMENTS

Figure 1:
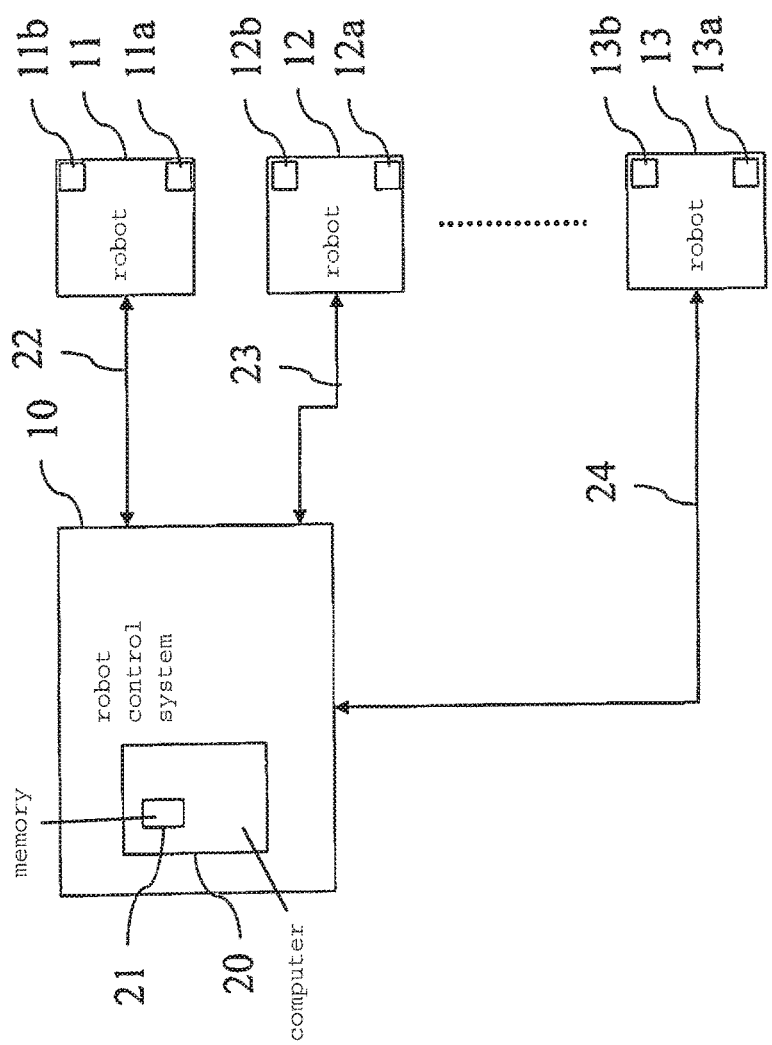
FIG. 1 shows a robot control system according to a first aspect of the present invention.

FIG. 1 shows a robot control system 10 that is configured to plan and allocate tasks to a plurality of robots 11, 12, 13 such that the plurality of agents, preferably robots 11, 12, 13, by fulfillment of their respective tasks, jointly achieve a common goal, thus achieving a predefinable mission $\mathcal{M}$. Robot control system 10 is equipped with communication means (not shown), e.g., a wireless networking transceiver, to communicate with each of the robots 11, 12, 13 via a communication link 22, 23, 24. Similarly, each of the robots 11, 12, 13 is equipped with corresponding communication means.

In a preferred embodiment, the robot control system 10 comprises a computer 20 with memory 21, on which a computer program is stored, said computer program comprising instructions that are configured to carry out the method according to aspects of the present invention described below if the computer program is executed on the computer 20.

In further aspects of the preferred embodiment, the robots 11, 12, 13 comprise a computer 11b, 12b, 13b each, said computer being equipped with a computer memory each (not shown) on which a computer program is stored, said computer program comprising instructions that are configured to carry out some or all of the method according to further aspects of the invention described below if the computer program is executed on the computer 11b and/or 12b and/or 13b. Preferably, the robots 11, 12, 13 each comprise actuators 11a, 12a, 13a that enable each of the robots to physically interact with an environment in which the robots are placed.

Figure 2:
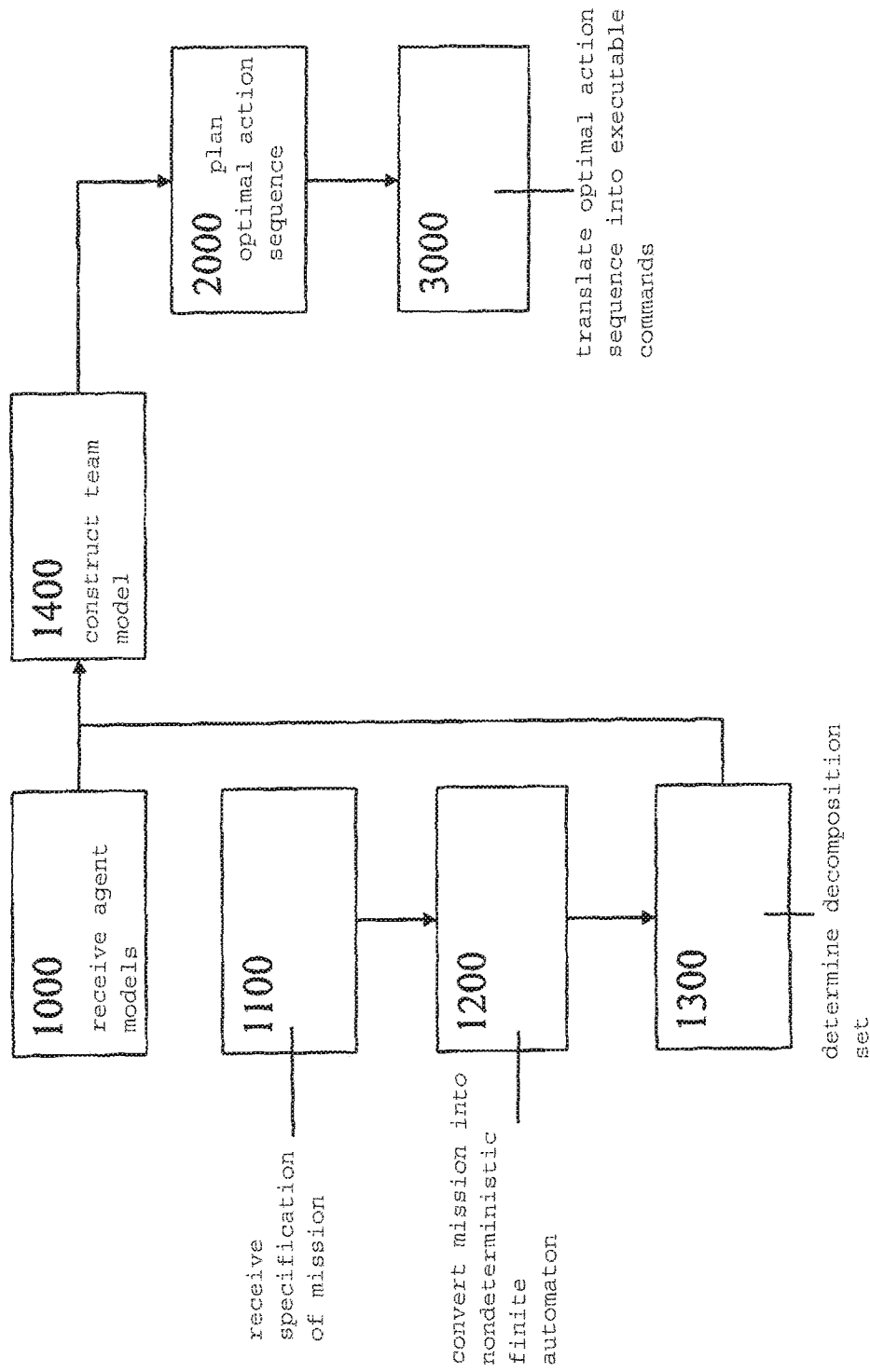
FIG. 2 shows a flow-chart diagram that illustrates a preferred method according to a further aspect of the present invention.

FIG. 2 shows a flow-chart diagram that illustrates a preferred method according to a further aspect of the present invention. In a first step 1000 the method receives an agent model $\mathcal{A}_1, \mathcal{A}_2, \mathcal{A}_3, \ldots$ each for each of the agents or robots 11, 12, 13. The agent models can for example be read from a dedicated location in computer memory 21.

These agent models $\mathcal{A}_1, \mathcal{A}_2, \mathcal{A}_3, \ldots$ are preferably each given as an automaton $\mathcal{A} = (\mathcal{S}_\mathcal{A}, s_{0,\mathcal{A}}, A_\mathcal{A}, \Pi, \lambda)$ consisting of a set of states $\mathcal{S}_\mathcal{A}$ that the corresponding agent or robot can be in an initial state $s_{0,\mathcal{A}} \in \mathcal{S}_\mathcal{A}$ a set of possible actions $A_\mathcal{A} \subseteq \mathcal{S}_\mathcal{A} \times \mathcal{S}_\mathcal{A}$ that the corresponding agent or robot can carry out a set of propositions $\Pi$ a labeling function $\lambda : \mathcal{S}_\mathcal{A} \to 2^\Pi$.

Modeling the agent models $\mathcal{A}_1, \mathcal{A}_2, \mathcal{A}_3, \ldots$ as an automaton as described is convenient because it is intuitive to model the internal state and the actions of the agents as a state machine. Furthermore, it is convenient to model an abstraction of places in the environment as a topological map.

Independently of step 1000, the method receives a specification of the mission $\mathcal{M}$ in step 1100. Preferably, this mission specification $\mathcal{M}$ is an LTL specification, e.g. a set of tasks $\{\mathcal{T}_1, \ldots, \mathcal{T}_n\}$. In a following step 1200, this mission specification $\mathcal{M}$ is converted into a nondeterministic finite automaton $\mathcal{F}$. Note that steps 1100 and 1200 are optional. Alternatively, the method may directly receive the mission specification $\mathcal{M}$ as the nondeterministic finite automaton $\mathcal{F}$. Then, in step 1300, the method determines the decomposition set $\mathcal{D}$ depending on the automaton $\mathcal{F}$. A preferred embodiment of this determination procedure is explained in detail in FIG. 3.

Following steps 1000 and 1300, the method constructs a team model $\mathcal{G}$ depending on the automaton $\mathcal{F}$, the decomposition set $\mathcal{D}$ and the agent models $\mathcal{A}_1, \mathcal{A}_2, \mathcal{A}_3 \ldots$ in step 1400. A preferred embodiment of this construction procedure is explained in detail in FIG. 4.

In the following step 2000, the method carries out a procedure of planning an optimal action sequence $\beta_{fin}$ based on the team model $\mathcal{G}$ which is explained in detail in FIG. 5.

In step 3000, the optimal action sequence $\beta_{fin}$ is translated into executable commands for the agents or robots 11, 12, 13, for example by means of a lookup table that may be stored in computer memory 21. The executable commands are each associated with one of the agents or robots 11, 12, 13 and distributed to the respective agent or robot 11, 12, 13 via one of the communication links 22, 23, 24. The respective agent or robot 11, 12, 13 then executes this command and preferably upon completion of the command sends a confirmation message to the robot control system 10. In case that the execution of this command is not possible, the respective agent or robot 11, 12, 13 may send an error notification to the robot control system 10, which may react accordingly. In case it receives a confirmation message that a command has been executed, it may send a next command to a next respective agent or robot 11, 12, 13. In the case it receives an error notification, it may enter a dedicated mode, e.g., a shut-down mode of all agents or robots 11, 12, 13.

Figure 3:
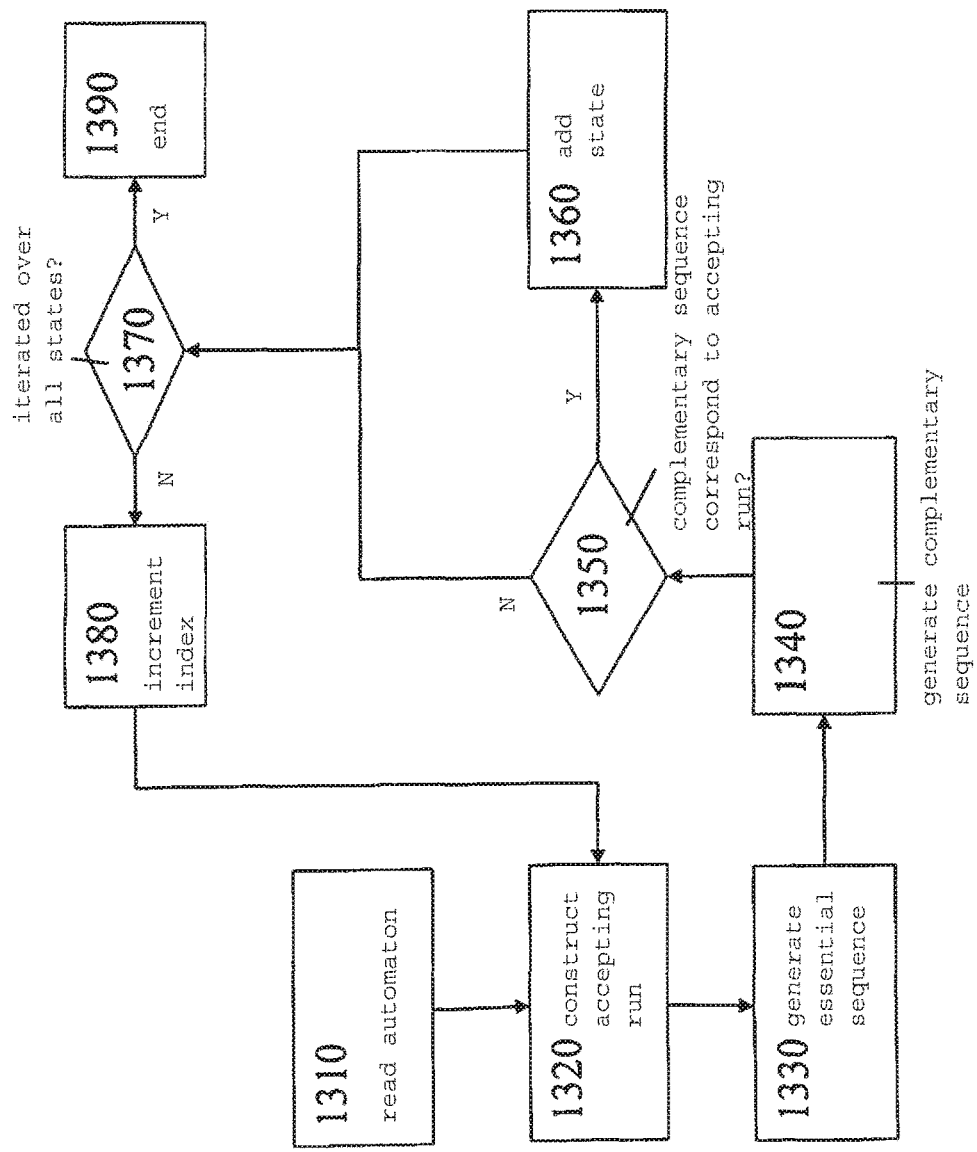
FIG. 3 shows a flow-chart diagram which relates to a preferred algorithm to determine the decomposition set $\mathcal{D}$.

FIG. 3 shows a flow-chart diagram that depicts a further aspect of the present invention, which relates to a preferred algorithm to determine the decomposition set $\mathcal{D}$. This method starts in step 1310 with a step of reading the aforementioned automaton $\mathcal{F}$. An index i that will be used to label all the states $\{q_i\} = Q$ of the set of states Q that is associated with the automaton $\mathcal{F}$. This index is initialized to an initial value, e.g. i=1. The decomposition set $\mathcal{D}$ is initialized as $\mathcal{D} = \emptyset$.

Then, in step 1320, the method constructs an accepting run $\rho_i$ that passes through state $q_i$ corresponding to the present value of the index i. State $q_i$ is the candidate decomposition state. Such an accepting run $\rho_i$ may for example be constructed by exploring the graph defined by the transition conditions δ associated with the automaton $\mathcal{F}$ and constructing a first partial run $\rho_f$ from state $q_i$ to initial state $q_0$ associated with automaton $\mathcal{F}$ while considering inverted transitions and a second partial run $\rho_i$ from state $q_i$ to a final state $f \in F$ associated with automaton $\mathcal{F}$. The accepting run $\rho_i$ that passes through $q_i$ may then be constructed by concatenating the inverted first partial run $\rho_f$ and the second partial run $\rho_i$.

In the following step 1330, the method generates an essential sequence $\sigma_e$ associated with the accepting run $\rho_i$.

A sequence $\sigma$ is called essential for nondeterministic finite automaton $\mathcal{F}$ and associated with a run $\rho$ if and only if it describes the run $\rho$ in $\mathcal{F}$ and $\sigma(t)\setminus\{\pi\} \not\models \delta(\rho(t-1), \rho(t))$ for all t and propositions $\pi \in \sigma(t)$, i.e., $\sigma$ contains only the required propositions.

For example, the essential sequence $\sigma_e$ may be generated from the accepting run $\rho_i$ by converting all propositions of corresponding transition conditions $\delta(\rho_i(t+1), \rho_i(t))$ of the accepting run $\rho_i$ to their respective disjunctive normal form and successively adding all propositions of each one conjunctive clause to the essential sequence $\sigma_e$ for all t.

In the following step 1340, the method generates a complementary sequences $\hat{\sigma}_e$ of the essential sequence $\sigma_e$. To this end partial sequences $\sigma_1$ and $\sigma_2$ are generated with $\sigma_1$ being the part of essential sequence $\sigma_e$ from its initial state to state $q_i$ and $\sigma_2$ being the remaining part of essential sequence $\sigma_e$ from state $q_i$ to its final state, i.e., essential sequence $\sigma_e = \sigma_1 \sigma_2$ is a concatenation of these two partial sequences $\sigma_1$ and $\sigma_2$. The complementary sequence $\hat{\sigma}_e$ is then generated by reversing the order of these two partial sequences $\sigma_1$ and $\sigma_2$, i.e., $\hat{\sigma}_e = \sigma_2 \sigma_1$.

Next follows step 1350, in which it is checked whether or not the complementary sequence $\hat{\sigma}_e$ corresponds to an accepting run (which amounts to a simple iterative check whether the propositions of the complementary sequence $\hat{\sigma}_e$ satisfy the transition conditions $\delta$). If it is determined that the complementary sequence $\hat{\sigma}_e$ is an accepting sequence, the method branches to step 1360 in which state $q_i$ is added to the decomposition set $\mathcal{D}$, after which the method continues with the execution of step 1370. If it is determined that the complementary sequence $\hat{\sigma}_e$ is not an accepting sequence, the method skips directly to step 1370.

In step 1370, it is checked whether index i has already iterated over all states $q_i$ of set Q, preferably by checking whether $i = \|Q\|$. If not, the method branches to step 1380 in which index i is incremented by an increment of 1 and the method continues with a next iteration in step 1320. If, however, it is determined that the index i has already iterated over all states $q_i$ of set Q, the method branches to step 1390, in which this part of the algorithm for determining the decomposition set $\mathcal{D}$ ends.

Figure 4:
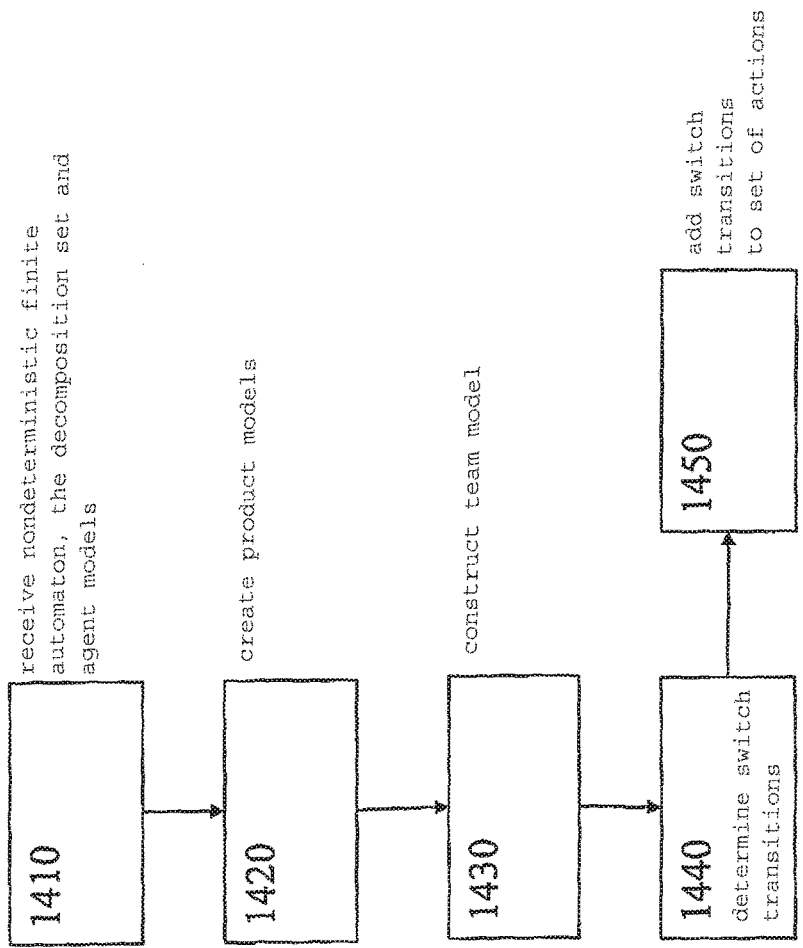
FIG. 4 shows a flow-chart diagram which relates to a preferred method to construct the team model $\mathcal{G}$.

FIG. 4 shows a flow-chart diagram that describes a preferred embodiment of a still further aspect of the present invention. This aspect relates a method for constructing the team model $\mathcal{G}$ from the nondeterministic finite automaton $\mathcal{F}$, the decomposition set $\mathcal{D}$ and the agent models $\mathcal{A}_1, \mathcal{A}_2, \mathcal{A}_3, \ldots$.

The method starts in step 1410, in which the nondeterministic finite automaton $\mathcal{F}$, the decomposition set $\mathcal{D}$ and the agent models $\mathcal{A}_1, \mathcal{A}_2, \mathcal{A}_3, \ldots, \mathcal{A}_n$. are received. For ease of notation, in the context of the discussion of FIG. 4 the models will be labelled with a generic labelling superscript (r), i.e the agent models will be denoted $\mathcal{A}^{(r)}$.

Next, in step 1420, a corresponding product model $P^{(r)}$ will be created for every agent model $\mathcal{A}^{(r)}$. By combining the agent model automaton $\mathcal{A}^{(r)}$ with the nondeterministic finite automaton $\mathcal{F}$ of the mission $\mathcal{M}$, the product model $\mathcal{P}^{(r)}$ can be constructed to capture both the agent capabilities encoded in the agent model automaton $\mathcal{A}^{(r)}$ and the specification of the mission $\mathcal{M}$ encoded in the nondeterministic finite automaton $\mathcal{F}$. Dropping the superscript (r) for ease of notation, conveniently, the product model $\mathcal{P}$ may be given by $\mathcal{P} = \mathcal{F} \otimes \mathcal{A} = (\mathcal{S}_\mathcal{P}, \mathcal{S}_{0,\mathcal{P}}, \mathcal{A}_\mathcal{P})$ comprising a set of states $\mathcal{S}_\mathcal{P} = Q \times \mathcal{S}_\mathcal{A}$ a set of initial states $\mathcal{S}_{0,\mathcal{P}} = Q_0 \times \{\mathcal{S}_{0,\mathcal{A}}\}$ a set of actions $A_\mathcal{P} = \{((q_s, s_s), (q_t, s_t)) \in \mathcal{S}_\mathcal{P} \times \mathcal{S}_\mathcal{P} : (s_s, s_t) \in A_\mathcal{A} \wedge \lambda(s_s) \models \delta(q_s, q_t))\}$.

For a plurality of agents, especially a plurality of robots, the respective agent models may differ from each other, each representing the capabilities of the respective agent, while the nondeterministic finite automaton $\mathcal{F}$ Y is determined by a particular specification of the mission $\mathcal{M}$. As such, the product model $\mathcal{P}$ may be constructed separately for each of the agents. It describes for each of the different agent how the mission $\mathcal{M}$ can be executed by the agent to which the agent model $\mathcal{A}^{(r)}$ corresponds.

Therefore, in a preferred embodiment for each $r \in \{1, \ldots, N\}$ the corresponding product model $\mathcal{P}^{(r)}$ is constructed as $\mathcal{P}^{(r)} = \mathcal{F} \otimes \mathcal{A}^{(r)}$ as defined above.

In order to combine a plurality of agents it is possible to construct a team model automaton $\mathcal{G}$ from the individual product models $\mathcal{P}^{(r)}$. This is done in step 1430.

The team model automaton $\mathcal{G}$ is conveniently constructed as a union of all the local product models $\mathcal{P}^{(r)}$ with $r \in \{1, \ldots, N\}$ as follows: The team model automaton $\mathcal{G}$ is constructed as $\mathcal{G} = (\mathcal{S}_\mathcal{G}, \mathcal{S}_{0,\mathcal{G}}, F_\mathcal{G}, \mathcal{A}_\mathcal{G})$, comprising a set of states $\mathcal{S}_\mathcal{G} = \{(r,q,s) : r \in \{1, \ldots, N\}, (q,s) \in \mathcal{S}_\mathcal{P}^{(r)}\}$ a set of initial states $\mathcal{S}_{0,\mathcal{G}} = \{(r,q,s) \in \mathcal{S}_\mathcal{G} : r=1, (q,s) \in \mathcal{S}_{0,\mathcal{P}}^{(r)}\}$ a set of final states $F_\mathcal{G} = \{(r,q,s) \in \mathcal{S}_{0,\mathcal{G}} : q \in F\}$ a set of actions $A_\mathcal{G} = \bigcup_r A_\mathcal{P}^{(r)}$.

In following step 1440 a set of switch transitions $\zeta \subset \mathcal{S}_\mathcal{G} \times \mathcal{S}_\mathcal{G}$ is determined. The set of switch transitions $\zeta$ is defined as the set of all those transitions $\zeta = ((r_s, q_s, s_s), (r_t, q_t, s_t))$ between a starting state $(r_s, q_s, s_s) \in \mathcal{S}_\mathcal{G}$ and a terminal state $(r_t, q_t, s_t) \in \mathcal{S}_\mathcal{G}$ which connect different agents, i.e. $r_s \neq r_t$, preserve the progress in the nondeterministic finite automaton $\mathcal{F}$, i.e. $q_s = q_t$, point to the next agent, i.e. $r_t = r_s + 1$ point to an initial agent state, i.e. $s_t = s_{0,\mathcal{A}}^{(r)}$, and start in the decomposition set $\mathcal{D}$, i.e. $q_s \in \mathcal{D}$.

Conveniently, the set of switch transitions $\zeta$ may be constructed by traversing all states $q_s$ in the decomposition set $\mathcal{D}$ and all starting agent indices $r_s = \{1, \ldots, N-1\}$. For this choice of state $q_s$ and starting agent index $r_s$, traversing all states $s_s$ for which $(q_s, s_s) \in \mathcal{S}_\mathcal{P}^{(r_s)}$ fixes $r_t, q_t, s_t$ and thus yields the set of switch transitions $\zeta$.

Figure 6:
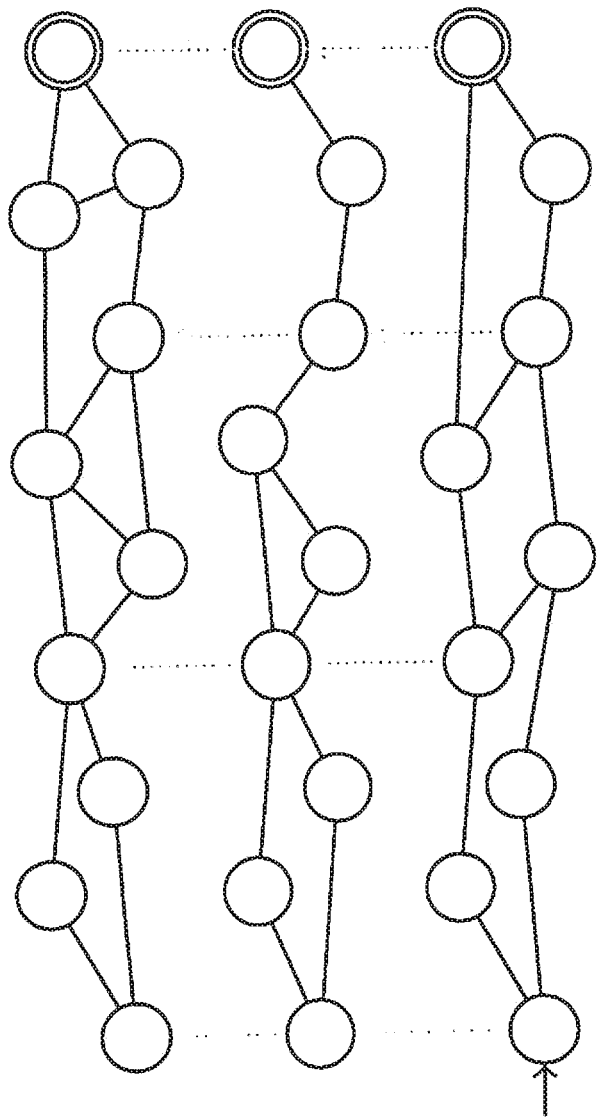
FIG. 6 illustrates an example of the structure of the team model.

An example of the structure of the team model $\mathcal{G}$ is depicted in FIG. 6, which shows an example of a system comprising three agents. The team model $\mathcal{G}$ has an initial state (bottom left corner) and three final states (right side). Between the agent automata, directed switch transitions $\zeta$ to the next agent connect states of the decomposition set $\mathcal{D}$.

In step 1450 following step 1440, the set of switch transitions $\zeta$ is added to the set of actions $A_\mathcal{G}$, i.e. $A_\mathcal{G} \to A_\mathcal{G} \cup \zeta$. This concludes the algorithm shown in FIG. 4. FIG. 5 shows a flow-chart diagram that describes a preferred embodiment of an even further aspect of the invention. This even further aspect of the invention relates to derive an action sequence $\beta_{fin}$ which minimize a team cost $\kappa$ for given agent models $\mathcal{A}^{(r)}$ of the team of agents 11, 12, 13, a cost function C, initial resources $\gamma_0 \geq 0$ and the specification $\phi$ of the mission $\mathcal{M}$ such that the specification $\phi$ is satisfied. An action sequence $\beta$ is called satisfying if the associated state sequence $\sigma$ satisfies the specification $\phi$.

Generally, an action sequence $\beta$ is preferably defined as $\beta = s_0 a_1 s_1 \ldots a_n s_n$ which is a run in $\mathcal{G}$ with $s_i \in S_{\mathcal{G}}$ and $a_i \in A_{\mathcal{G}}$. In order to distribute $\beta$ among the involved agents, $\beta_{\mathcal{P}}^{(r)}$ for agent r is preferably obtained by projecting $\beta$ onto $\mathcal{P}^{(r)}$.

Conveniently, the cost function C may be defined as follows. Each action of the team model $\mathcal{A}_{\mathcal{G}}$ is assigned a non-negative cost, i.e. $C: \mathcal{A}_{\mathcal{G}} \to \mathbb{R}_{\geq 0}$. For switch transitions $\varsigma$, preferably the associated cost $C(\varsigma)$ is chosen as zero to reflect the fact that switch transitions $\varsigma$ are purely virtual and will not appear in the action sequence $\beta^{(r)}$ executed by the agents 11, 12, 13.

For modelling the multi-agent character of a cost, it is convenient to extend the cost C(a) associated with an action $a \in \mathcal{A}_{\mathcal{G}}$ to a vector of the same dimensionality N as the number of agents 11, 12, 13, i.e. $C(a) \in \mathbb{R}_{\geq 0}^N$ where each agent r=1, ..., N represents one dimension.

To reflect the fact that each action a with non-zero cost $c_a = C(a)$ is associated with a particular agent by the fact that $\mathcal{A}_{\mathcal{G}} \setminus \zeta = \cup_r A_{\mathcal{P}}^{(r)}$, it is convenient to define $$c_{a,i} = \begin{cases} C(a), & \text{if } i = r \\ 0, & \text{otherwise} \end{cases}$$

and $c_{\varsigma} = 0$. Consequently, the costs $c_{\beta}$ associated with an action sequence $\beta$ can be computed as $c_{\beta} = \Sigma_{a \in \beta} c_a$.

Given a set of action sequences, a Pareto front of all cost vectors $c_{\beta}$ for satisfying action sequences $\beta$ then forms a set of potentially optimal solutions. In order to prioritize these solution, in a preferred embodiment one may compute an overall team cost $\kappa$ as $\kappa(c_{\beta}) = (1-\epsilon)\|c_{\beta}\|_{\infty} + \epsilon\|c_{\beta}\|_1$, where $\epsilon \in (0, 1]$ may be chosen fixed but freely. This conveniently reflects an objective to minimize the maximal agent cost $\|c_{\beta}\|_{\infty}$, e.g. minimizing a completion time of mission $\mathcal{M}$, and an objective to avoid unnecessary actions of the agents 11, 12, 13 via a regularization term $\|c_{\beta}\|_1$.

To save memory requirements for storing the cost vector $c_{\beta}$, preferably the cost vector $c_{\beta}$ is stored as a compressed cost vector $\hat{c}_{\beta}$ which is three-dimensional, independent of the number of agents, by recursively choosing $$\hat{c}_{\beta} = \begin{pmatrix} \|(c_{\beta,1}, \ldots, c_{\beta,r-1})^T\|_{\infty} \\ \|(c_{\beta,1}, \ldots, c_{\beta,r-1})^T\|_1 \\ c_{\beta,r} \end{pmatrix} \quad (1)$$

This definition exploits the mathematical truth discovered as part of the work leading to the invention that given a fixed but arbitrary agent r, the team cost $\kappa$ of the action sequence $\beta$ can already be evaluated for all agents r'<r since no action associated with any of these agents r' will occur in a continuation of $\beta$.

This makes it possible to simplify the computation of the team cost $\kappa$ by instead computing a compressed team cost $$\hat{\kappa}(\hat{c}_{\beta})(1-\epsilon)\|(\hat{c}_{\beta,1}, \hat{c}_{\beta,3})^T\|_{\infty} + \epsilon\|(\hat{c}_{\beta,2}, \hat{c}_{\beta,3})^T\|_1, \quad (2)$$

with $\hat{c}_{\beta,i}$ denoting the i-th component of the compressed cost vector $\hat{c}_{\beta}$. This representation not only removes a dependency of the team cost $c_{\beta}$ on the team size N, it also a more efficient representation during planning. The reason for this efficiency gain is that additional cost vectors are Pareto-dominated as will be discussed below in the discussion of step 2100, and can thus be eliminated from the set of potential solutions much earlier in the planning process.

Furthermore, in addition to the specification $\phi$ which allows to model discrete constraints, in an optional further development is possible to consider constraints of the agents in continuous domains, like for example constraints on resources $\gamma$. A change of resources $\gamma$ may be modeled by a resource function $\Gamma: \mathcal{A}_{\mathcal{G}} \to \mathbb{R}^M$ where M indicates the number of resource dimensions that models the change of resources $\gamma$ under a given action $a \in \mathcal{A}_{\mathcal{G}}$. Conveniently, the resource function can take both negative and positive values to reflect the fact that resources can be modified in both directions.

For the action sequence $\beta$, the resulting status of resources $\gamma_{\beta}$ is given by $\gamma_{\beta} = \gamma_0 + \Sigma_{a \in \beta} \Gamma(a)$. The set of satisfying action sequences is constrained to sequences $\beta = s_0 a_1 s_1 \ldots a_n s_n$ such that at any state $s_x \in \beta$ and a truncation $\beta'$ of sequence $\beta$ until this state $s_x$, i.e. $\beta' = s_0 a_1 \ldots a_x s_x$ it holds that $\gamma_{\beta',i} > 0$ for each component i=1, ..., M. In other words, the action sequences $\beta$ are constrained such that the inequality constraint of the resources $\gamma_{\beta}$ holds at any time during the execution of the action sequence $\beta$.

Note that it is also possible to express constraints of the from $\gamma_{\beta,i} \geq 0$ within this framework by choosing a fixed offset $\xi$ smaller than the minimal change $\gamma_{\Delta,i}$ of the resource component $\gamma_{\beta,i}$ under an exchange of any one action $a_j \in \mathcal{A}_{\mathcal{G}}$ for any other action $a_k \in \mathcal{A}_{\mathcal{G}}$, i.e. $\gamma_{\Delta,i} = \min_{(a_j, a_k)} |\Gamma(a_j)_i - \Gamma(a_k)_i|$. The constraint $\gamma_{\beta,i} \geq 0$ can then be modeled as an equivalent inequality constraint $\gamma_{\beta,i} + \xi > 0$.

While it would be possible to capture interval constraints of the form $\gamma_{\beta,i} \in I = (I_l, I_u)$ by a set of two inequality constraints, a more preferred solution that introduces a smaller number of Pareto optimal labels as explained below is to remodel the interval constraint as $$\gamma_{\beta,I} - \frac{I_u - I_l}{2} > 0$$

where $$\gamma_{\beta,I} = \|\frac{I_u - I_l}{2} + I_l - \gamma_{\beta,i}\|$$

denotes a distance measure of $\gamma_{\beta,i}$ from the center of the interval I.

The actual algorithm for the planning problem discussed above is based on a label-setting approach which can be thought of as a multi-criteria generalization of the Dijkstra shortest path search. Instead of operating on states with associated costs, the label-setting algorithm constructs a set of labels for each state. For each state $s \in S_{\mathcal{G}}$, a label l will be given as $l = (\hat{c}_{\beta}, \gamma_{\beta}, v, i_v)$ which depends on the action sequence $\beta$ that led to state s, $\hat{c}_{\beta}$ is the associated compressed cost and $\gamma_{\beta}$ the associated resource status, $v \in S_{\mathcal{G}}$ is the state that precedes state s in action sequence $\beta$ and $i_v$ is the respective predecessor label.

In other words, the construction of such a multi-dimensional label l fore each state s is an extension of the team-model state space $S_G$ to a higher-dimensional, infinitely large label space $\mathcal{L}_G$, in which each label $l \in L_{G,s} \subset \mathcal{L}_G$ of state s instantiates one possible continuous resource configuration γ and transitions between the labels are described by their predecessor relations. $L_{G,s}$ denotes the set of instantiated, i.e., feasible, labels at state s and $L_G = \cup_{s \in S_t} L_{G,s} \subset \mathcal{L}_G$ denotes the set of all feasible labels.

It is possible to model a resource constraint as a proposition $\pi_i$, e.g., $\pi_i := (\gamma_{\beta,i} > 0)$. Whether or not $\pi_i$ is true would, in the state space $S_G$, depend on a full action sequence β. However, in label space $\mathcal{L}_G$, $\pi_i$ is either true or false for each element of the label space $\mathcal{L}_G$ since it is possible to associate a single label $l \in \mathcal{L}_G$ with a specific $\gamma_{l,i} = \gamma_{\beta,i}$ as its second component. In a preferred embodiment, the resource constraints are indeed modeled in this way and denote the corresponding set of resource constraint propositions with $\Pi_\gamma$.

Figure 5:
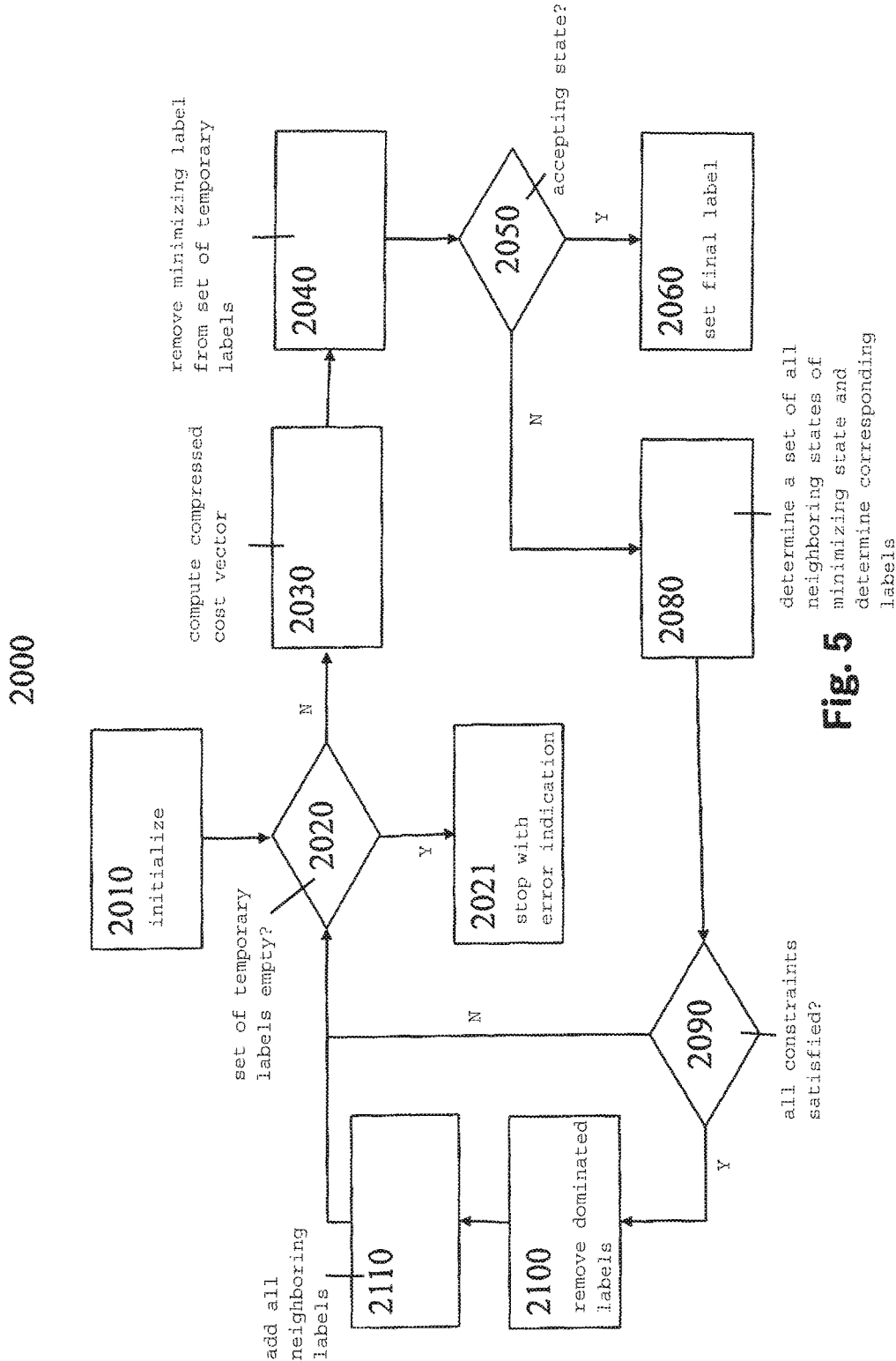
FIG. 5 shows a flow-chart diagram which relates to a preferred method to plan an optimal action sequence.

The actual algorithm which is illustrated in FIG. 5 starts with an initialization in step 2010. A set of temporary labels $L_{t,v}$ is initialized as $L_{t,v} = \{0, \gamma_0, \emptyset, \emptyset\}$ for each initial state $v \in S_{0,G}$. For each other state $s \in S_G \setminus S_{0,G}$, a set of temporary labels $L_{t,s}$ is initialized as $L_{t,s} = \emptyset$. Furthermore, for each state $s \in S_G$ a set of permanent labels $L_{p,s}$ is initialized as $L_{p,s} = \emptyset$.

In the following step 2020, it is checked whether the set of temporary labels $L_{t,s}$ is empty for each state s. If this is the case, no final state f is reachable and the algorithm stops with an error indication in step 2021, which may result in a controlling agents 11, 12, 13 accordingly, e.g. by transitioning the control system 10 into a safe state.

If, however, it is determined that the set of temporary labels $L_{t,s}$ is not empty for at least one state s, the method proceeds to step 2030. In step 2030, the compressed cost vector compressed cost vector $\hat{c}_\beta$ is computed according to equation (1) and the compressed team cost $\hat{\kappa}(\hat{c}_\beta^{(l)})$ is computed according to equation (2). This is possible since each label l specifies its predecessor label, and the action sequence β leading to label l can be reconstructed. Then, a minimizing state s* and a minimizing label l* from the corresponding set of temporary labels $L_{t,s}$* is determined such that they minimize the compressed team cost $\hat{\kappa}$, i.e.

$$(s^*, l^*) = \mathrm{argmin}_{s \in S_G, l \in L_{t,s}} \hat{\kappa}(\hat{c}_\beta^{(l)}).$$

In the next step 2040, the minimizing label l* is removed from the set of temporary labels $L_{t,s}$, corresponding to the minimizing state s*, i.e. $L_{t,s}^* \leftarrow L_{t,s}^* \setminus \{l^*\}$ and added to the corresponding set of permanent labels $L_{p,s}^*$, i.e. $L_{p,s}^* \leftarrow L_{p,s}^* \cup \{l^*\}$.

In the following step 2050, it is checked whether the minimizing state s* is an accepting state. If this is the case, the method continues with step 2060, if not, it continues with step 2080.

In step 2060, a final label $l_{fin}$ is set to label l*. As outlined above, the corresponding final action sequence $\beta_{fin}$ is reconstructed iteratively from the predecessor labels. The final action sequence $\beta_{fin}$ is the selected action sequence β with minimal compressed team costs $\hat{\kappa}$ and hence minimal team costs κ. This concludes the algorithm.

In step 2080, a set V of all neighboring states v of minimizing state s* and a corresponding set $L_v$ of corresponding neighboring labels is determined. For example, V may be determined by intitializing $V = \emptyset$, $L_v = \emptyset$, exploring each state $v = (r_v, q_v, s_v) \in S_G$ and adding state v to set V if and only if there is an action a that links the minimizing state s* to state v, i.e. $a = (s^*, v) \in \mathcal{A}_G$. If state $v \in S_G$ is added to set V, the corresponding new costs $\hat{c}_{new}$ are computed depending on action a via $$\hat{c}_{new} = \begin{cases} \begin{pmatrix} \| \hat{c}_1^{(l)}, \hat{c}_3^{(l)} \|_\infty \\ \| \hat{c}_2^{(l)}, \hat{c}_3^{(l)} \|_1 \\ 0 \end{pmatrix} & \text{if } a \in \zeta \\ \hat{c}^{(l)} + (0, 0, C(a))^T & \text{otherwise} \end{cases}.$$

Similarly, corresponding new resources $\gamma_{new}$ are computed depending on action a via $$\gamma_{new} = \begin{cases} \begin{pmatrix} \gamma_{global}^{(l)} \\ \gamma_{0,r_v} \end{pmatrix} & \text{if } a \in \zeta \\ \gamma^{(l)} + \Gamma(a) & \text{otherwise} \end{cases}.$$

In this formula, $\gamma_{global}^{(l)}$ denotes the part of the resources $\gamma^{(l)}$ that is global, i.e. independent of the agent, and $\gamma_{0,r_v}$ denote the initial resources of agent $r_v$. A corresponding new label $l_v = (\hat{c}_{new}, \gamma_{new}, s^*, i_{s^*})$ is generated, with $i_{s^*} = \mathrm{card}(L_{p,s^*})$. This corresponding new label $l_v$ is then added to the set of neighboring labels $L_V$. After exploration of all states v is completed, the method continues with step 2090.

In the next step 2090, it is checked it is checked for each neighboring label $l \in L_v$ whether the corresponding new resource status $\gamma_{new}$ satisfies all constraints. For this purpose, an extended transition function $\Delta : \mathcal{A}_G \times \mathbb{R}^M \to \{\top, \bot\}$ which is an extension of the transition function δ of the nondeterministic finite automaton $\mathcal{F}$ is defined as $\Delta : (a = ((r_s, q_s, s_s), (r_t, q_t, s_t)), \gamma) \mapsto (\lambda(s_s) \cup \Pi_\gamma) \models \delta(q_s, q_t)$. The action $a_l$ associated with neighboring label l is determined and it is checked whether $\Delta(a_l, \gamma_{new})$ is true. If it is not true, the method branches back to step 2020. If it is true, however, it is also checked whether the neighboring label l is non-dominated in the Pareto sense.

For ease of notation, an operator $<_P$ denotes a "less than"-relation in the Pareto sense, i.e. $(a_1, \ldots, a_n)^T <_P (b_1, \ldots, b_n)^T \Leftrightarrow a \neq b \wedge a_i \leq b_i \forall i \in \{1, \ldots, n\}$. An operator $\leq_P$ relaxes this relation and also allows a=b. A label is non-dominated in the Pareto sense if there does not exist another label $\tilde{l}$ in either the set of temporary labels $L_{t,s}$ or the set of permanent label $L_{p,s}$ at the same state v such that $(\hat{c}^{(\tilde{l})}, -\gamma^{(\tilde{l})}) \leq_P (\hat{c}^{(l)}, -\gamma^{(l)})$.

If it is found that no such label $\tilde{l}$ exists, it is deemed that the neighboring label l is non-dominated in the Pareto sense and the method continues with step 2100. If, however, such a label $\tilde{l}$ exists, the method skips back to step 2020.

In step 2100, all labels $\tilde{l}$ which are dominated by any neighboring label $l \in L_v$ where said neighboring label found to satisfy all constraints and be non-dominated in the Pareto sense by another label are removed from the set of temporary labels $L_{t,v}$ at the same state v, i.e., $L_{t,v} \leftarrow L_{t,v} \setminus \{\tilde{l} \in L_{t,v} : l <_P \tilde{l}\}$.

Next, in step 2110, all said aforementioned neighboring labels l are added to the set or temporary labels $L_{t,v}$, i.t. $L_{t,v} \leftarrow L_{t,v} \cup \{l\}$. The method then continues with step 2020.

What is claimed is:

1. A method for controlling a plurality of agents to complete a mission, comprising:
   deriving a decomposition set of decomposition states in a set of possible states of an automaton, wherein the automaton represents a specification of the mission including all tasks of the mission, the automaton being defined by a tuple including: (i) the set of possible states, (ii) a set of initial states, the set of initial states being a subset of the set of possible states, (iii) a set of Boolean formulas over a set of atomic propositions, (iv) transition conditions, and (v) a set of accepting states, the set of accepting states being a subset of the set of possible states;
   deriving a sequence of actions to be carried out by the plurality of agents depending on the decomposition set, where each of the actions is to be carried out by at most one of the plurality of agents; and
   providing a control signal for controlling the plurality of agents in accordance with the derived sequence of actions.

2. The method according to claim 1, further comprising:
   controlling the plurality of agents in accordance with the derived sequence of actions.

3. The method according to claim 1, further comprising:
   generating the decomposition set by exploring an essential sequence of an accepting run through one or more candidate decomposition states.

4. The method according to claim 3, further comprising:
   adding the one or more candidate decomposition state to the decomposition set depending on whether a complementary sequence to the explored essential sequence around the respective one or more candidate decomposition state is accepting.

5. The method according to claim 4, wherein in which the decomposition set includes all those states in the set of possible states of the automaton, for which the complementary sequence to the explored essential sequence around the respective state is accepting.

6. The method according to claim 1, further comprising:
   generating a team model based on the automaton that represents a specification of the mission and based on automata that each model the capabilities of one of the plurality of agents.

7. The method according to claim 6, wherein the team model comprises a set of actions that comprises switch transitions which change the acting agent from one of the plurality of agents to another one of the plurality of agents.

8. The method according to claim 7, wherein the switch transitions are configured to each change the acting agent from one of the plurality of agents to a next one of the plurality of agents.

9. The method according to claim 8, wherein the switch transitions are configured such as to act only if the automaton that characterizes the mission is in a decomposition state.

10. The method according to claim 6, further comprising:
    deriving the sequence of actions to be carried out by the plurality of agents by a label-setting algorithm in which each state of a set of states of the team model is associated with labels that are characterized by a sequence of action leading to the respective state.

11. The method according to claim 10, further comprising:
    constructing a reachable set of temporary labels for each state and a set of permanent labels.

12. The method according to claim 11, further comprising:
    constructing, for each selected label, a set of consecutive labels by extending an action sequence associated with the selected label by all available actions and adding the resulting labels to the reachable set of temporary labels.

13. The method according to claim 12, wherein each label comprises at least one component that characterizes a cost under the corresponding sequence of actions.

14. The method according to claim 13, wherein the derived sequence of actions to be carried out by the plurality of agents is the one out of all actions that satisfy a characterization of the mission that minimizes a team cost which depends on the component that characterizes the cost.

15. The method according to claim 14, wherein only actions resulting in Pareto-optimal labels at their target state are added to the reachable set of temporary labels.

16. The method according to claim 13, wherein the component that characterizes the cost under the corresponding sequence of actions is depending on costs associated with each of these actions with one component each for each one of the agents.

17. The method according to claim 16, wherein the component that characterizes the cost under the corresponding sequence of actions is stored in memory by way of a data structure that comprises at least one component that characterizes costs associated with a selected one of the agents and at least one component that characterizes the costs associated with a group of agents that precede the selected one of the agents.

18. The method according to claim 17, wherein each label comprises at least one component that characterizes a resource status at the respective state under the corresponding sequence of actions.

19. The method according to claim 18, wherein the characterization of the mission comprises an inequality constraint that restricts the at least one component that characterizes a resource status to a predefined region.

20. A non-transitory machine-readable storage medium on which is stored a computer program for controlling a plurality of agents to complete a mission, the computer program, when executed by a computer, causing the computer to perform:
    deriving a decomposition set of decomposition states in a set of possible states of an automaton, wherein the automaton represents a specification of the mission including all tasks of the mission, the automaton being defined by a tuple including: (i) the set of possible states, (ii) a set of initial states, the set of initial states being a subset of the set of the possible states, (iii) a set of Boolean formulas over a set of atomic propositions, (iv) transition conditions, and (v) a set of accepting states, the set of accepting states being a subset of the set of possible states;
    deriving a sequence of actions to be carried out by the plurality of agents depending on the decomposition set, where each of the actions is to be carried out by at most one of the plurality of agents; and
    controlling the plurality of agents in accordance with the derived sequence of actions.

21. A system for controlling a plurality of agents to complete a mission, which is configured to:
    derive a decomposition set of decomposition states in a set of possible states of an automaton, wherein the automaton represents a specification of the mission including all tasks of the mission, the automaton being defined by a tuple including: (i) the set of possible states, (ii) a set of initial states, the set of initial states being a subset of the set of possible states, (iii) a set of Boolean formulas over a set of atomic propositions, (iv) transition conditions, and (v) a set of accepting states, the set of accepting states being a subset of the set of possible states;

derive a sequence of actions to be carried out by the plurality of agents depending on the decomposition set, where each of the actions is to be carried out by at most one of the plurality of agents; and control the plurality of agents in accordance with the derived sequence of actions.

22. The system according to claim 21, further comprising at least one of the plurality of agents.

* * * * *